US008064474B2

(12) United States Patent  (10) Patent No.: US 8,064,474 B2
Lynch et al.  (45) Date of Patent: Nov. 22, 2011

(54) METHOD AND APPARATUS FOR SELECTING A RESPONDER TO ENABLE RELIABLE MULTICAST

(75) Inventors: Bradley Lynch, Ottawa (CA); Christopher Green, Renfrew (CA)

(73) Assignee: Qualcomm Atheros, Inc., San Jose, CA (US)

( * ) Notice: Subject to any disclaimer, the term of this patent is extended or adjusted under 35 U.S.C. 154(b) by 2441 days.

(21) Appl. No.: 10/391,776

(22) Filed: Mar. 20, 2003

(65) Prior Publication Data

US 2004/0184427 A1    Sep. 23, 2004

(51) Int. Cl.
*H04J 3/26* (2006.01)

(52) U.S. Cl. ........................................ 370/432; 370/346

(58) Field of Classification Search .................. 714/748, 714/749, 750; 370/432, 351–356, 342–346; 709/213, 203
See application file for complete search history.

(56) References Cited

U.S. PATENT DOCUMENTS

| | | | | |
|---|---|---|---|---|
| 5,036,518 | A | * | 7/1991 | Tseung .......................... 714/748 |
| 5,627,829 | A | | 5/1997 | Gleeson et al. |
| 5,844,888 | A | * | 12/1998 | Markkula et al. ............. 370/255 |
| 5,896,391 | A | | 4/1999 | Solheim et al. ................ 371/5.1 |
| 6,122,483 | A | * | 9/2000 | Lo et al. ........................ 455/12.1 |
| 6,418,138 | B1 | | 7/2002 | Cerf et al. ..................... 370/352 |
| 6,496,477 | B1 | | 12/2002 | Perkins et al. ................. 370/228 |
| 6,522,650 | B1 | * | 2/2003 | Yonge et al. .................. 370/390 |
| 6,571,277 | B1 | * | 5/2003 | Daniels-Barnes et al. ..... 709/213 |
| 6,604,142 | B1 | * | 8/2003 | Bertrand et al. .............. 709/227 |
| 6,665,705 | B1 | * | 12/2003 | Daniels-Barnes et al. ..... 709/203 |
| 6,765,885 | B2 | | 7/2004 | Jiang et al. |
| 6,904,464 | B1 | * | 6/2005 | Van Langen et al. ......... 709/237 |
| 7,808,932 | B2 | * | 10/2010 | Chen et al. ..................... 370/270 |
| 2001/0012319 | A1 | | 8/2001 | Foley |
| 2002/0001314 | A1 | | 1/2002 | Yi et al. |
| 2002/0131591 | A1 | | 9/2002 | Henson et al. |
| 2003/0231652 | A1 | | 12/2003 | Sprague et al. |
| 2003/0231658 | A1 | | 12/2003 | Liang et al. |
| 2004/0008728 | A1 | | 1/2004 | Lee |
| 2004/0184481 | A1 | | 9/2004 | Lee |
| 2005/0091399 | A1 | * | 4/2005 | Candan et al. ................ 709/238 |
| 2005/0122994 | A1 | | 6/2005 | Mangin et al. |
| 2006/0166653 | A1 | * | 7/2006 | Xu et al. ..................... 455/412.2 |

OTHER PUBLICATIONS

Kuri et al., "Reliable Multicast in Multi-Access Wireless LANs," Wireless Networks, ACM, US, vol. 7, No. 4, Jul. 2001, pp. 359-369.
Internet Document: "An Error Control Scheme for Large-Scale Multicast", Christos Papadopoulos et al., Feb. 7, 2003.
Article: "Reliable Multicast in Multi-access Wireless LANs", Joy Kuri, IEEE 1999.
Internet Document: "Reliable IP Multicast, The challenges and solutions of reliable data delivery using IP Multicast in a heterogeneous network", Bob Quinn, Feb. 6, 2003.

* cited by examiner

*Primary Examiner* — Chuong T Ho

(57) ABSTRACT

A station to serve as a proxy for responding to a multicast message is selected using dynamically maintained information about other stations communicatively coupled to a shared communications network. The dynamically maintained information is used to select a station having a high probability of replying to the multicast message. Network performance may be further improved by re-selecting proxies when a multicast frame fails to acknowledged.

26 Claims, 7 Drawing Sheets

METHOD AND APPARATUS FOR SELECTING A RESPONDER TO ENABLE RELIABLE MULTICAST

CROSS-REFERENCE TO RELATED APPLICATIONS

This is the first application filed for the present invention.

MICROFICHE APPENDIX

Not Applicable.

TECHNICAL FIELD

The invention relates to multicast delivery of messages in a shared communications medium, and in particular to a method of selecting a responding station to provide a response to a multicast or a broadcast message.

BACKGROUND OF THE INVENTION

Multicasting data is an important and efficient communications technique that is widely used in many communications environments. Multicasting permits numerous (n) network elements or communicatively coupled stations to receive a data unit without requiring establishment of n separate connections between a sender and the n stations. As is well understood by those skilled in the art, powerline networks are one example of a communications environment in which multicasting is used.

FIG. 1 schematically illustrates a typical powerline network including a part of a power distribution network 8 to which a plurality of stations 10 are connected. The stations 10 provide two interfaces: a physical layer interface to the power distribution network 8, and a link layer interface (as will be further explained below with reference to FIG. 2). The link layer interface provides a home networked device 12 with media access control (MAC) layer functionality. As will be appreciated by those skilled in the art, the home networked device 12 may also include network, transport, session, presentation and application layers.

Each station 10 is connected to the power distribution network 8, and uses the power distribution network 8 as a physical layer shared medium for transporting data. It has been established that orthogonal frequency division multiplexing (OFDM) is a suitable method for modulating a data signal for transmission over the shared medium, such as the power distribution network 8.

FIG. 2 schematically illustrates principal functional blocks of the station 10 shown in FIG. 1. The station 10 includes a powerline modulator and demodulator 16 (modem) that provides the physical layer interface, a device input/output 18 (I/O) that enables the link layer interface, a frame and medium access control service 20, and a link management service 22.

The powerline modem 16 typically uses OFDM and a concatenated forward error correction scheme during the transmission of data. The device I/O 18 provides MAC level primitives to the home networked device 12, and is therefore adapted to exchange data transported by the physical layer with the home networked device 12.

The frame and medium access control service 20 receives data from the home networked device 12 through the device I/O 18. If the data does not fit in a single MAC protocol data unit (MPDU), the data is segmented and reassembled by the frame and medium access control service 20. The data is framed in one or more MPDU payloads in accordance with a suitable MAC layer protocol, and is transported by the physical layer, accordingly. In order for the station 10 to transmit a frame, the station 10 must first acquire access to the medium. In accordance with the powerline networking implementations, access to the medium is enabled by monitoring a state of the medium using a carrier sense to determine when access may be requested in accordance with a predefined, distributed procedure. Stations contend for the access using an exponential back-off algorithm, when permitted to contend by rules of the predefined distributed procedure. The frame and medium access control service 20 also performs delivery control to ensure that each message for which a response is expected, is acknowledged, and that retry procedures are effected when required.

Well known delivery control techniques provide more reliable multicast message delivery. In order for multicast messages to be reliably delivered, acknowledgements (ACKs) need to be returned to a sender from receivers. If multiple stations respond to a multicast message, collision occurs. It is therefore known in powerline networking environments, to select a station as a proxy for all of the receivers of the multicast message so that only one response is received at the transmitting station.

Link management service 22 performs physical (PHY) and MAC management functions, exchanges necessary messaging with the other stations, and evaluates link level operations in a known manner. For example, the link management service 22 formulates and issues, under predefined conditions, physical layer feedback relating to a condition of the medium as it pertains to a quality of signaling between the station 10 and the other stations communicatively coupled to the network. The physical layer feedback in an OFDM modulation scheme is typically a tone map. The tone map indicates which of a plurality of orthogonal frequency channels (tones) defined by the OFDM standard, are currently to be used for communicating with an identified one of the other stations. On average, a tone map is likely to become obsolete in a matter of seconds. Consequently, the tone maps are typically renewed in accordance with a predefined algorithm. A more detailed description of tone map renewal is provided in Applicant's co-pending U.S. patent application Ser. No. 09/932,945, filed on Aug. 21, 2001 entitled METHOD AND APPARATUS FOR CONSTRUCTING A SUB-CARRIER MAP, which is incorporated herein by reference.

FIG. 3 schematically illustrates a multicast transmission format in accordance with a Homeplug® standard. The data is transported in a frame that is bounded by a start of frame delimiter, and an end of frame delimiter. A third delimiter (a response delimiter) is issued by a station selected as a proxy by the sender, after the frame is transmitted. Separating the frame and the end of frame delimiter is an end of frame gap; and separating the end of frame delimiter and the response delimiter, is a response interframe space. The interval required to transmit a multicast frame and receive a response is hereinafter referred to as a transmission interval. Each transmission interval is preceded by a contention resolution period during which the sending station obtains access to the medium, in a manner well known in the art.

The delimiters (start of frame, end of frame and response) all have substantially the same format. They include a preamble 52,56,62, and a frame control section 50,58,60. The preamble is used by physical layer transmission equipment for such purposes as automatic gain control, etc. The content of the frame control 50,58,60 and frame body 54 is passed up to the medium access control (MAC) layer to provide an indication of the data/response. The content of the frame control 50,58,60 includes medium control information 50*b*, 58*b*,60*b*, including contention control bits 50*a*,58*a*,60*a* that indicate whether the frame conveys a segment defined in accordance with a segment bursting feature of the Homeplug® protocol. Each delimiter further indicates whether it is a start of frame, end of frame, or response delimiter. The start of frame delimiter indicates a length of the frame.

The frame consists of a frame body 54 having a header portion 54*a*, followed by a content portion, and ending with a checksum 54*c*. The frame body 54 consists of a segment control (SC) section, and addressing fields; including a destination address field 54*a*$_2$. The segment control section contains a multicast flag 54*a*$_1$. The multicast flag 54*a*$_1$ is set when the address in the DA field points to the proxy rather than the multicast address. During multicast transmissions these fields are universally inspectable, i.e. any station that detects the start of frame delimiter also inspects these fields to determine if the frame is addressed to the station The content portion is the only part of this frame that is of variable length (up to a predetermined maximum number of symbols), and is the only part that may be encrypted. Information relating to a length the frame body 54 and an indication of whether a response is expected are specified in the medium control information 50*b* in the frame control 50, so that, upon receipt of a start of frame delimiter, any station can determine when the current transmission interval ends, and a next contention resolution period begins. The content is not universally inspectable, and is generally longer than the universally inspectable portion of the frame. It contains a payload with pad bits, in any frame, but, given that the frame illustrated is a multicast frame, the multicast flag 54*a*$_1$ is set, the address in the destination address field 54*a*$_2$ is the address of a chosen proxy, and the payload is prefixed by a multicast frame extension 54*b* containing a 6 byte multicast destination address. The multicast frame extension 54*b* may be a MAC management entry of a multicast with response type. The multicast destination address 54*b* is the destination address that is to be associated with the data. However, since the MAC layer is designed to ensure that only frames addressed to the receiving station are responded to, the address of the proxy is inserted into the destination address (DA) field 54*a*$_2$.

FIG. 4 is a flow chart illustrating a prior art procedure for transmitting multicast messages. The procedure begins, in step 100 when a frame and medium access control algorithm 20 receives data from either the device I/O 18, or the link management service 22 (FIG. 2) to be multicast. The multicast frame extension 52 is created for the frame (step 102).

An address of a proxy selected randomly, or as a station least likely to receive the frame is inserted into an address field of the frame (step 104). As explained above, the destination address field 54*a*2 in a header part of the frame body 54 used for specifying the proxy address when the multicast flag 54*a*$_1$ is set. If the data does not fit in a single frame payload, it is divided into a plurality of segments, each sized to fit in a payload portion of a frame (step 105).

The data is then framed, and signaling and control bits well known in the art, are inserted into the fields of the frame overhead, the frame delimiters, etc. (step 106A).

The frame and medium access control services 20 then obtain access to the medium (step 107), and transmit the frame (step 108). If the frame carries one of a plurality of segments, it is identified as such using the segment control field (last segment flag), and contention control bits in the start and end of frame delimiters (unless the frame carries the last segment), are used to assert privileged access to the medium in a subsequent transmission interval, using a well known technique called segment bursting. Once the frame is sent, a response timer is set (step 110) by the frame and medium access control algorithm 20. If a response to the multicast message is received (as determined in step 112) before the response timer expires (in step 113), the multicast frame is deemed successfully sent, and the retry count is reset to zero (step 114). If the multicast frame is deemed successfully sent, it is determined in step 115 if another segment exists. If another segment is awaiting delivery, the procedure returns to step 107, and the frame containing the next segment is transmitted (after access to the medium is obtained). Otherwise, the procedure ends successfully.

If the timer expires before a response is received by the frame and medium access control algorithm 20 (as determined in step 113), a collision is inferred (step 116), and a retry procedure is applied. The retry procedure involves incrementing a retry counter (step 118), and determining if the retry count exceeds a predefined number of retries. If the retry count is greater than the predefined number (as determined in step 120), the multicast message has not been acknowledged in spite of repeated retries, and a delivery failure is declared (step 122). Accordingly, the source of the data may be sent a delivery failure notice. Even if only one of a plurality of segments is not deliverable, the entire packet is deemed undelivered. On the other hand, if the retry count is less than the predetermined number (step 120), the procedure backs off (step 124), and returns to step 107. As is well known in the art, back-off entails setting a timer (for an extended interframe space+a random back-off time) and waiting for the timer to expire before sending a frame. If any transmission is sensed in the meantime and a next contention resolution period is determined, the timer is annulled.

The method described above with reference to FIG. 4 is disclosed in U.S. Pat. No. 6,522,650, entitled MULTICAST AND BROADCAST TRANSMISSION WITH PARTIAL ARQ, which issued to Yonge et al. on Feb. 18, 2003. Yonge et al. teach the procedure for selecting a multicast proxy. The multicast proxy is selected from a set of the stations from which transmission feedback is received. Preferably, the selection is narrowed to the members of the multicast group. The selection is either random, or a station is chosen that appears to be least likely to correctly receive and respond to the message.

However, extensive experimentation has shown that implementation of Yonge et al's partial-ARQ (automatic repeat request) can result in network performance degradation. In accordance with Yonge's teachings the same proxy is used each time a multicast frame is sent, unless a random proxy selection is forced for each multicast packet, or a valid channel map has been received that indicates a station having a lower transmission bandwidth than a currently selected multicast proxy when a multicast packet is to be sent. Thus, if the selected proxy becomes unavailable or fails to respond for any reason, delivery failure ensues. Furthermore, if the proxy station becomes disconnected from the network, or enters an energy saving or 'sleep' mode, the station may not be able to respond to multicast messages, resulting in unproductive retransmission of the multicast frame, and eventually, a delivery failure.

There therefore remains a need for a method for selecting a proxy for responding to a multicast message that ensures reliable network performance and reduces transmission delivery failures.

SUMMARY OF THE INVENTION

It is therefore an object of the invention to provide a method and system for selecting a proxy to respond to a multicast message with improved reliability, and a reduced transmission delivery failure rate.

Another object of the invention is to use availability information associated with stations communicatively coupled to the medium to select a proxy station that is most likely to be able to respond to a multicast message.

It is yet another object of the invention to improve a probability of receiving a response to a multicast message by changing a proxy after a preset number of retransmission attempts.

Accordingly, a station communicatively coupled to a plurality of other stations by a shared communications medium selects one of the other stations using dynamically maintained availability information about the other stations. The dynamically maintained availability information includes information related to failure of the other stations to respond to a message. In particular, if a station fails to provide a response to a multicast message, a likelihood of choosing that station as a proxy is reduced until new availability information about that station is received.

Preferably the selection of a proxy station occurs whenever required, and the availability information is updated to permit a successful reselection, before a delivery failure is occurs.

In accordance with an aspect of the invention, a method is provided for selecting a proxy to respond to a multicast message sent from a first station in a shared medium network. The method involves maintaining availability information about the other stations that are identified to the first station in transmissions sent over the medium. Accordingly, the medium is monitored in a manner well known in the art, and accumulated availability information is used for the proxy selection. The proxy selection applies predetermined selection criteria using the availability information to select the proxy. If a selected proxy fails to respond to a multicast message, the availability information associated with the selected proxy is updated to ensure that the station is not selected as proxy until new availability information about the station is received.

The availability information may include physical layer feedback associated with the other stations received at the station that does the proxy selection. A time when the physical layer feedback is received can be used to determine a likelihood that the station is available to respond to the multicast message.

The predetermined criteria may further relate to a quality of transmission indicated by the respective station, a status of the respective station, and a time since the respective station has successfully transmitted a message to another station communicatively coupled to the shared medium network, for example.

If it is determined that no proxy can be selected given the current availability information, the method may further involve prompting the other stations for physical layer feedback.

If a station failed to respond to a multicast message after a given number of attempted transmissions, the station's availability information may be updated to indicate that the station should not be used as a multicast proxy. The unusable state of the station will change when a subsequent transmission over the shared medium provides physical layer feedback indicating that the station can be used as a multicast proxy. In general updating the availability information associated with the station when the physical layer feedback associated with the station is received is part of the maintaining the availability information.

In accordance with yet another aspect of the invention, a station communicatively coupled with a plurality of other stations by a shared communications medium includes a link management service adapted to maintain availability information about the other stations that are communicatively coupled to the shared communications medium, and to use the availability information to select a one of the other stations to serve as a multicast proxy to respond to a multicast message. The service updates the availability information associated with the station selected as the multicast proxy, if the multicast proxy fails to respond to the multicast message within a predefined period of time. The service may further be adapted to maintain the availability information using physical layer feedback received from the other stations, and to select the proxy using predefined selection criteria, including a time since physical layer feedback was received from the respective other stations.

The service may further be adapted to select the other station to serve as the multicast proxy using at least one of a tone map provided by the other station; a status of the station; and, a time since the other station has transmitted or acknowledged receipt of received a message.

Maintaining the availability information may further involve monitoring the shared communications medium to track addresses of stations that successfully transmit messages, logging information regarding a time of the successful transmission, and selecting one of the other stations that has most recently sent a message successfully received by another of the stations. In this case, the service may be adapted to update the availability information after determining that the proxy has failed to respond to the multicast message after a predetermined number of attempted transmissions. The service may also update the availability information associated with the station selected to serve as the multicast proxy in order to indicate that the station should not be selected again until new availability information about the station is received.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals, except where otherwise indicated.

DETAILED DESCRIPTION OF THE PREFERRED EMBODIMENT

The invention provides a method and apparatus for selecting a proxy to respond to a multicast message in a shared medium network. The proxy selection is based on predefined selection criteria, and does not normally yield the same proxy each time it is applied. The proxy selection procedure identifies a station that is likely to respond to the multicast message. More particularly, the proxy selection procedure is applied to a set of stations dynamically determined to be communicatively coupled to the network. The selection process involves an evaluation of a perceived ability of the stations in the set to respond to the multicast message.

It should be understood that while the invention will be described with reference to a powerline networking environment, this particular networking environment merely provides a known structure of reference in which the invention can be described. The only feature of the powerline network that is essential to the invention is that it permits multicast message acknowledgement using a sender-selected proxy.

Figure 1:
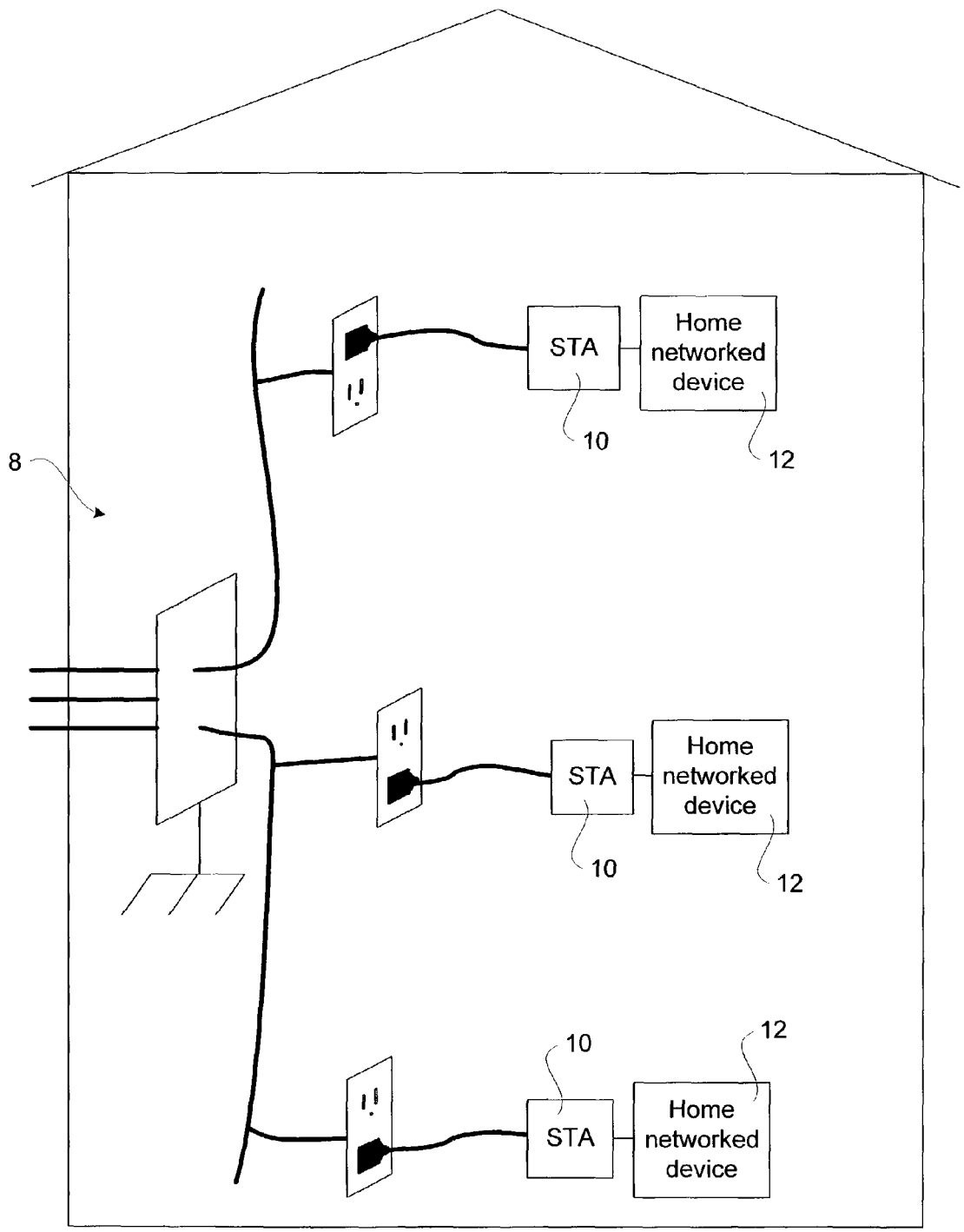
FIG. 1 schematically illustrates a powerline network, in which the invention may be deployed.
Figure 2:
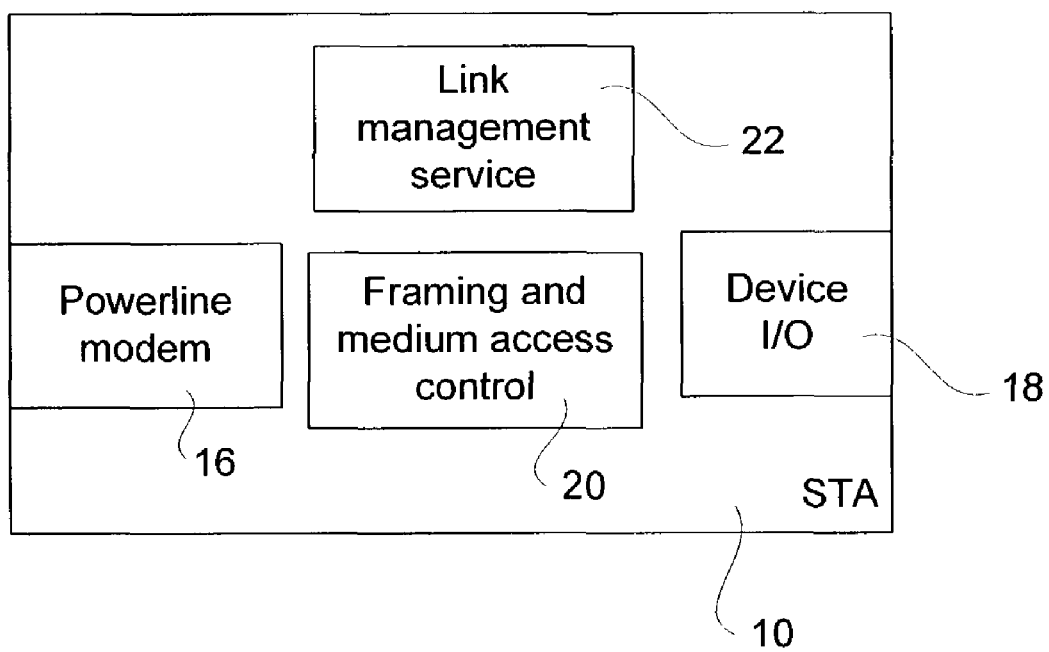
FIG. 2 schematically illustrates principal components of a station of the network shown in FIG. 1.
Figure 3:
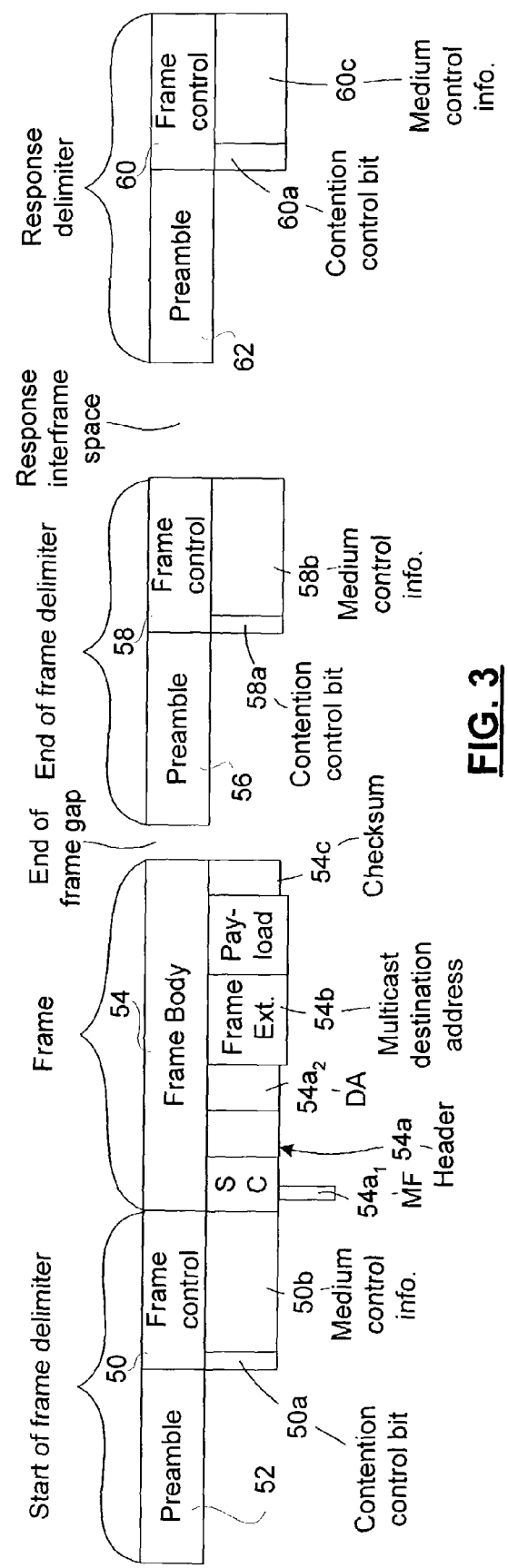
FIG. 3 schematically illustrates relevant parts of a frame in accordance with the Homeplug® standard.
Figure 4:
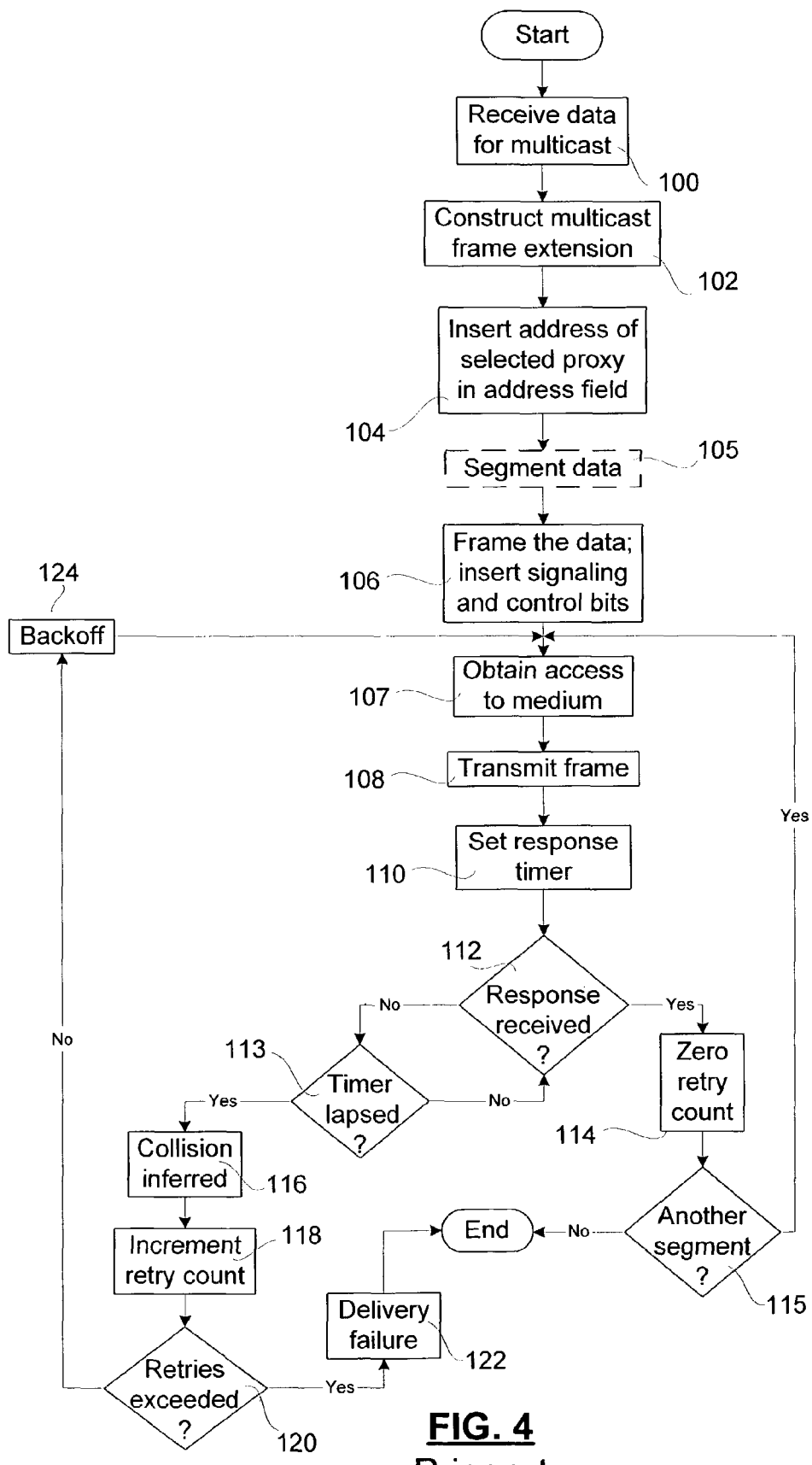
FIG. 4 is a flow chart illustrating a prior art method of transmitting a multicast message from a station.
Figure 5:
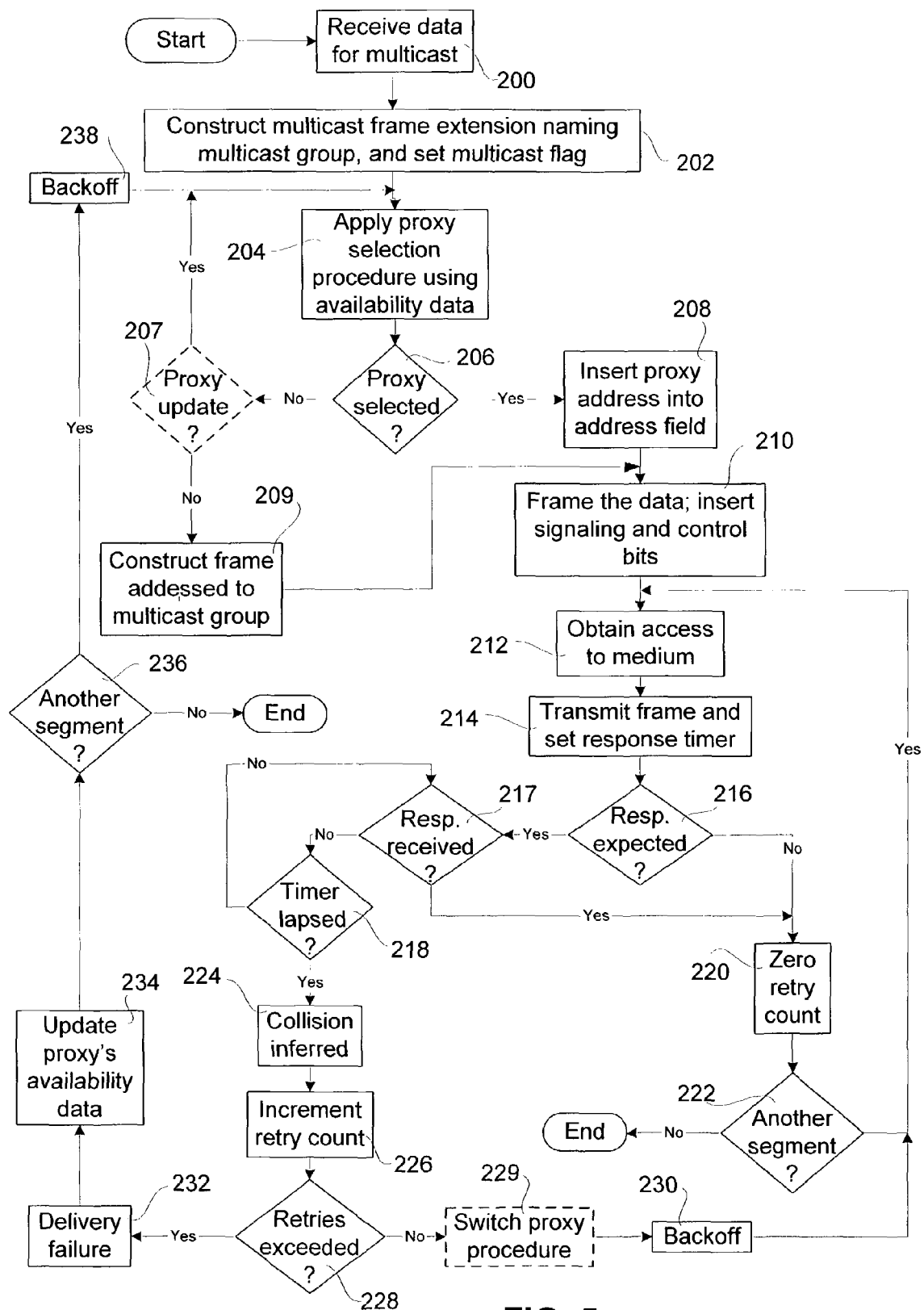
FIG. 5 schematically illustrates a method of transmitting a multicast message from a station in accordance with an embodiment of the invention.
Figure 6:
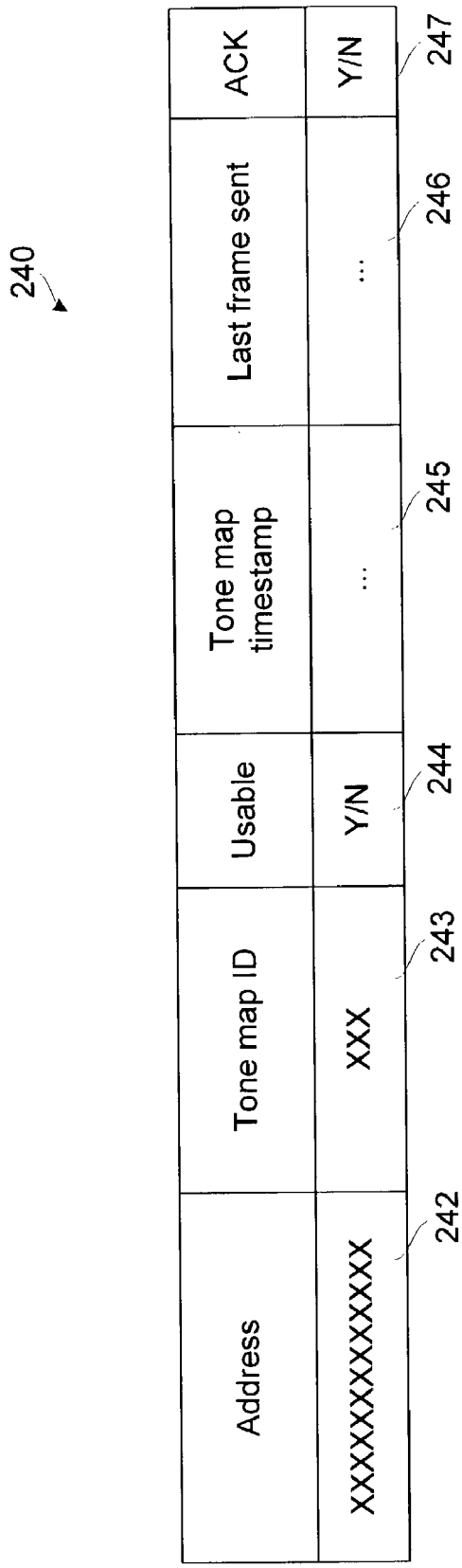
FIG. 6 is a schematic illustration of one example of proxy availability table in accordance with the invention.

FIG. 5 is a flow chart illustrating a procedure in accordance with the invention for transmitting a multicast message to a multicast group. The procedure incorporates a proxy selection process that provides a significant likelihood of receiving a reply from the proxy station. The procedure begins in step 200, when the station 10 receives data for a multicast transmission. The data is framed, and signaling and control bits are inserted, in accordance with a predefined protocol (step 202). The link management service 22 (FIG. 2) then applies the proxy selection procedure using stored availability data to select a station that is likely able to reply to the multicast message (step 204). Some example proxy selection procedures are described in more detail below. If the application of the selection procedure successfully selects a proxy station (step 206), the address of the proxy station is inserted into the destination address field of the header of the frame (step 208), a multicast frame extension identifying the multicast group is constructed, and the multicast flag is set (step 210). Otherwise, in step 209, a frame addressed to the multicast group is formulated. Regardless of whether the selection algorithm returns an indication that a proxy has been selected, the frame is now constructed, and the frame and medium access control service 20 then obtains access to the medium (step 212), transmits the frame, and sets the response timer (step 214).

If no proxy is selected, as determined in step 206, an optional proxy update procedure 207 that will be explained in detail below with reference to FIG. 7 may be applied. If the optional proxy update is not performed, the algorithm advances to step 210, in which case no reply to the message is expected. Otherwise, either one of two events occurs. A response to the frame is received (as determined in step 217), or the response time expires (as determined in step 218). If a response is received before the response time expires, or if a response is not expected, the retry count is zeroed (step 220), and it is determined (step 222) whether another segment is awaiting transmission. If another segment exists, the procedure returns to step 212. Otherwise the procedure ends successfully.

If an expected response is not received before the response timer lapses (as determined in step 218), a collision is inferred (step 224), and the retry counter is incremented (step 226). If the value of the retry counter does not exceed a predefined threshold, the frame and medium access control service 20 optionally performs a switch proxy procedure, which will be explained in detail below with reference to FIG. 8. In either case, the medium access control service 20 performs a back-off procedure (step 230), and then returns to step 212 to resend the frame.

Otherwise, if the frame and medium access control service 20 has retried sending the frame the predefined number of times, a delivery failure is indicated to the source of the data (step 232), and availability data relating to the proxy station is updated (step 234). The update to the proxy availability data lowers the likelihood that the proxy station will be chosen again, until a new tone map is received from the proxy station, for example. In some embodiments a failed delivery entirely precludes the station from being selected as a multicast proxy again until a new tone map is received from the station, or it is determined that the station has successfully transmitted a frame.

In step 236 it is determined whether another segment is awaiting delivery. If a next segment is waiting to be sent, the frame and medium access control service 20 performs the back-off procedure (step 238) and returns to step 204, in spite of the delivery failure notification sent to the data source in step 232.

It will be evident to those skilled in the art that the algorithm for sending multicast messages is linked with a procedure for transmitting messages in general, and that the procedure may be embodied as part of a larger hardware and software data transmission system.

Proxy Selection

The proxy selection procedure uses information related to the availability of potential proxy stations to select a proxy station that is likely to reply to a multicast message.

As described above, tone maps are exchanged between the stations by respective link management services 22 so that currently preferred sets of the OFDM channels are used for conveying data between a sending station and a station that supplied the tone map. Each station maintains a table of tone maps so that, in the event that it is required to send a frame to any of the other stations, the data can be modulated on the frequencies identified in the tone map. Accordingly, one embodiment of the proxy selection procedure uses the tone map table to select the multicast proxy.

The proxy selection procedure may select a most recent tone map that has not been identified as unusable, in response to failed transmission attempts as described above with reference to step 234 of FIG. 5. Updating the proxy's availability data may involve flagging the tone map as "unusable". When a new tone map is received, or it is detected that the station has successfully sent a message to any station, the flag is removed, and the previous failure is ignored.

The tone maps include a number of frequencies that are to be used when communicating with the originator of the tone map. This provides a convenient metric of the quality of the medium between the stations. Accordingly this, or any other quality of transport property, may be used as a selection criterion for the multicast proxy.

In accordance with the invention, the passive monitoring of the medium can also be used to track stations that have sent data frames or response delimiters. The table of availability data for the networked stations may be maintained using dynamically monitored information about stations that have successfully and/or unsuccessfully sent data. This information can be used as an alternative to or in conjunction with the tone maps.

Figure 7:
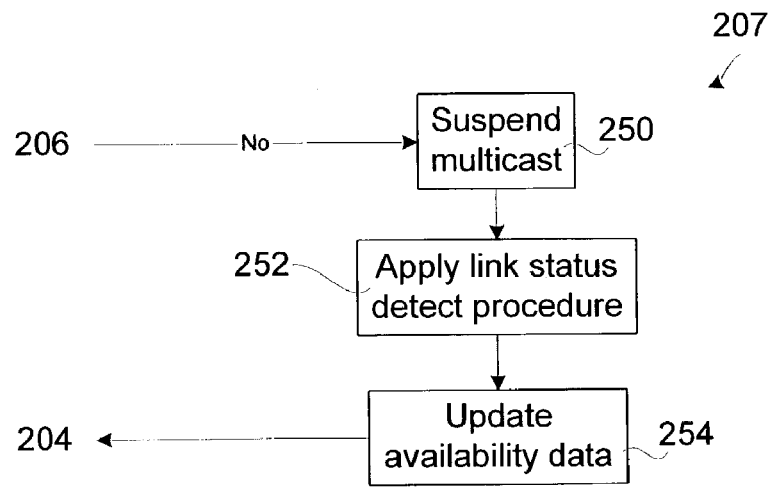
FIG. 7 is a flow chart illustrating details of an optional multicast proxy update procedure shown in FIG. 6.

FIG. 7 shows one example of a proxy availability information table 240 that can be used to implement the invention. The table shown in FIG. 7 is exemplary only and does not represent required fields or represent an exhaustive list of information that can be used for multicast proxy selection.

In this example, the proxy information availability table 240 includes MAC address 242 of each other station communicatively coupled to the network. The MAC address 242 is the station address inserted into the destination address field of multicast frames, as described above. A tone map ID 243 identifies a tone map provided by the station. Alternatively, the tone map, per se, can be stored in the table 240. The "usable" flag 244 indicates whether the tone map can be used during proxy selection, as described above with reference to step 234 of FIG. 5. A time field 245, having a desired granularity indicates when the tone map was received from the station. Another time field 246, of a desired granularity, tracks when a medium sense indicated that the subject station last sent a packet. An acknowledge flag 247 indicates whether the last frame sent by the subject station was acknowledged by the addressee.

Those skilled in the art will appreciate that fields 242, 243 and 245 of the table 240 constitute information that is normally stored by the link management service 22 of prior art stations 10. Consequently, the table 240 may be structured around or associated with that data in a way that minimizes duplication and conserves memory use.

Proxy Update Procedure

FIG. 7 illustrates principal steps involved in multicasting messages using an embodiment of the invention in the event that the proxy selection procedure fails to identify a proxy (step 206 of FIG. 5). In accordance with the algorithm described with reference to FIG. 7, the data is multicast in an unreliable mode when no information is available to permit a multicast proxy to be selected. In accordance with this embodiment of the invention, multicast transmission is suspended (step 250) until a link status is determined (step 252). As will be apparent to those skilled in the art, procedures for determining link status generally involve issuing one or more service messages and receiving replies from other networked stations, which normally include a tone map. The link status information is used to update the availability information (step 254) so that when the procedure returns to step 204 (FIG. 5) to apply the proxy selection procedure, a different result is obtained. If the procedure for determining link status fails, the station may advance to step 209 (FIG. 5) or the station may reiterate the procedure for determining link status after a predefined period, for example.

If a time sensitivity is associated with the multicast data, a determination can be made as to whether time is available for suspending the multicast request. If insufficient time is available, the data may be multicast in the unreliable mode shown in FIG. 7. Otherwise, the proxy availability data may be updated as shown in FIG. 8.

Switch Proxy Procedure

Figure 8:
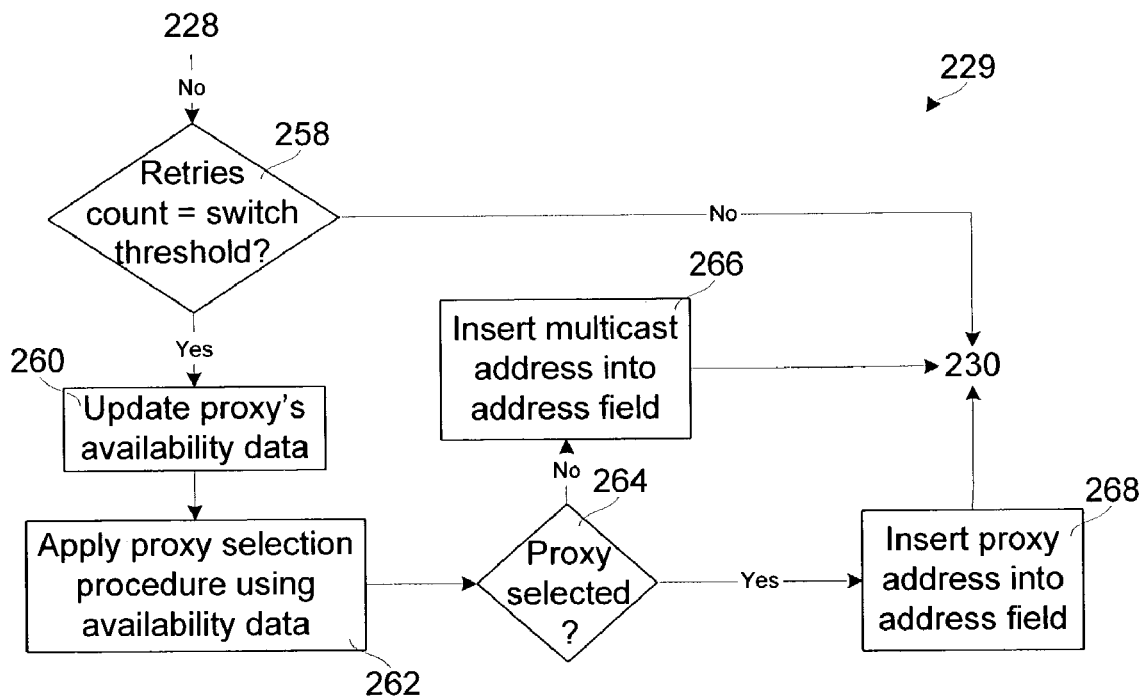
FIG. 8 is a flow chart illustrating details of an optional proxy switching procedure shown in FIG. 6.

FIG. 8 illustrates another embodiment of the invention in which dynamic proxy selection is extended to the multicast frame level. As illustrated in FIG. 8, if repeated attempts to transmit a multicast frame are unsuccessful, the algorithm switches proxies after a predefined number of retry attempts. For example, if 10 retries are permitted, one or more switch proxy thresholds may be defined, so that a new multicast proxy is selected after each threshold is exceeded. The number of switch proxy thresholds may be chosen in dependence on the number of stations in the network, and the number of retries permitted, for example. The number of switch proxy thresholds may also be dynamically computed as a function of the number of unusable station indications that appear in the proxy availability table. The respective switch thresholds may be provisioned, re-computed at predefined intervals, or computed each time a collision is inferred.

As shown in FIG. 8, if the number of retries is incremented (step 226 of FIG. 5) after a collision is inferred (step 224 of FIG. 5), and it is determined that the number of retries has not been exceeded (step 228 of FIG. 5), it is determined in step 258, whether the current retry count equals one of the switch proxy thresholds. If the retry count is equal to a switch proxy threshold, the procedure advances to the step 230 of FIG. 8, and the back-off procedure is executed, as explained above.

Otherwise, in step 260 the proxy availability data is updated, to reduce a probability that the proxy that failed to respond to prior retry attempts will be selected again when the proxy selection procedure is applied (step 262). If the proxy selection procedure successfully identifies a proxy (as determined in step 264), the multicast frame is modified to insert the address of the new multicast proxy into the destination address field of the multicast frame to be resent (step 268). If the application of the proxy selection procedure fails to identify a proxy station, as determined in step 264, the multicast address is inserted into the multicast frame (step 266) and the procedure reverts to unreliable multicast mode, as described above with reference to FIG. 7. The procedure then advances to step 230 of FIG. 5.

An advantage of switching proxies during the retry procedure is that a probability that the frame will be acknowledged is improved in the event that a selected proxy station is taken off-line, or there are persistent problems with a connection to the proxy station. Advantageously, this does not increase a number of times the same frame is re-transmitted.

The selection of a multicast proxy designated to respond to a multicast message may be based on any dynamically maintained information that is generated, to improve the probability of receiving a response to the a multicast message. The examples described above are therefore intended to be exemplary only. The scope of the invention is therefore intended to be limited solely by the scope of the appended claims.

We claim:

1. A method of selecting a proxy station to respond to a multicast message sent from a first station in a shared medium network, the method comprising:
   maintaining, by the first station, availability information about other stations that are identified to the first station in transmissions over the shared medium;
   selecting, by the first station, one of the other stations to serve as a multicast proxy to respond to the multicast message sent from the first station using the availability information and predetermined selection criteria; and
   updating, by the first station, the availability information associated with the selected station if the selected station fails to respond to the multicast message within a predefined time limit, where the updating comprises updating the availability information associated with the selected station to indicate that the selected station should not be used as a multicast proxy until a subsequent transmission over the shared medium provides physical layer feedback which indicates that the selected station can be used as a multicast proxy;
   wherein updating the availability information if the selected station fails to respond to the multicast message reduces a probability that the selected station that failed to respond to the multicast message will be selected to serve as the multicast proxy in a subsequent proxy selection procedure.

2. The method as claimed in claim 1 wherein:
   maintaining availability information comprises receiving physical layer feedback associated with respective ones of the stations, and dynamically updating the availability information when physical layer feedback associated with any one of the other stations is received.

3. The method as claimed in claim 2 wherein selecting one of the other stations to serve as a multicast proxy using the predefined selection criteria comprises evaluating the availability information to determine a time since the physical layer feedback was received from each of the other stations.

4. The method as claimed in claim 3 wherein evaluating the availability information comprises determining at least one of: a quality of transmission indicated by the respective station; a status of the respective station; and, a time since the respective station has successfully transmitted a message to another station communicatively coupled to the shared medium network.

5. The method as claimed in claim 4 wherein maintaining the availability information further comprises prompting the other stations for the physical layer feedback if the physical layer feedback is not received within a predetermined time.

6. The method as claimed in claim 2 wherein the shared medium provides multiple independent channels and receiving the physical layer feedback comprises receiving an identification of which of the independent channels should be selected for use when the first station communicates with the respective other station.

7. The method as claimed in claim 6 wherein the shared medium is used to convey orthogonal frequency division multiplexed (OFDM) channels modulated using a modulation technique, and the receiving of the identification comprises receiving a modulation map.

8. The method as claimed in claim 1 wherein:
maintaining the availability information comprises monitoring the shared medium to track addresses of stations that successfully send a message to another station; and
logging information regarding a time of the successful transmission.

9. The method as claimed in claim 8 wherein selecting one of the other stations to serve as a multicast proxy further comprises selecting a station that most recently successfully transmitted a message to another station.

10. The method as claimed in claim 1 wherein determining whether the selected station fails to respond to the multicast message within a predefined time limit comprises:
determining whether the selected station has failed to respond to the multicast message after a given number of attempted transmissions.

11. The method as claimed in claim 10 further comprising updating the availability information associated with the selected station when the physical layer feedback associated with the selected station is received.

12. The method as claimed in claim 1 wherein:
maintaining availability information comprises determining a likelihood that a station is available based on time when physical layer feedback is received from at least one of the other stations.

13. The method as claimed in claim 1 wherein the availability information includes data that a station transmitting a multicast message uses to ensure a significant likelihood of receiving a reply in response to the multicast message.

14. The method as claimed in claim 1 wherein the availability information includes tone map information supplied to the first station by a second station of the other stations, and the tone map information identifies one or more frequencies for communicating with the second station.

15. The method as claimed in claim 14 wherein the tone map information includes a plurality of frequencies for modulating messages between the first station and the second station.

16. The method as claimed in claim 1 wherein the availability information includes an availability information table having at least a column indicating a usability of a station as the proxy.

17. The method as claimed in claim 1 further comprising in response to receiving a transmission over the shared medium providing physical layer feedback indicating that the selected station can be used a multicast proxy, updating the availability information associated with the selected station to indicate that the selected station is available for use as a multicast proxy.

18. The method as claimed in claim 1 further comprising, if no proxy can be selected based on the availability information, prompting the other stations for physical layer feedback.

19. A station communicatively coupled with a plurality of other stations by a shared communications medium, the station being configured perform a proxy selection procedure, the station being configured to:
maintain availability information about the other stations that are communicatively coupled to the shared communications medium;
use the availability information to select one of the other stations to serve as a multicast proxy to respond to a multicast message sent by the station; and
update the availability information associated with the station selected to serve as the multicast proxy, if the station selected to serve as the multicast proxy fails to respond to the multicast message within a predefined period of time, where the updating comprises updating the availability information associated with the station selected to serve as the multicast proxy to indicate that the station should not be selected again unless a subsequent transmission indicates that the station can be used as a multicast proxy;
wherein updating the availability information if the selected station fails to respond to the multicast message reduces a probability that the selected station that failed to respond to the multicast message will be selected to serve as the multicast proxy in a subsequent proxy selection procedure.

20. The station as claimed in claim 19 wherein:
the proxy selection procedure is configured to maintain the availability information using physical layer feedback received from the other stations, and to select the proxy using predefined selection criteria, including a time since physical layer feedback was received from the respective other stations.

21. The station as claimed in claim 20 wherein the proxy selection procedure is further configured to select the other station to serve as the multicast proxy using at least one of a tone map provided by the other station; a status of the station; and, a time since the other station has transmitted or acknowledged receipt of received a message.

22. The station as claimed in claim 19 wherein:
maintaining the availability information further comprises monitoring the shared communications medium to track addresses of stations that successfully transmit messages, logging information regarding a time of the successful transmission, and selecting one of the other stations that has most recently sent a message successfully received by another of the stations.

23. The station as claimed in claim 19 wherein the proxy selection procedure is configured to update the availability information after determining that the station selected to serve as the multicast proxy has failed to respond to the multicast message after a predetermined number of attempted transmissions.

24. The station as claimed in claim 23 wherein the proxy selection procedure is further configured to update the availability information associated with the station selected to serve as the multicast proxy when physical layer feedback associated with the station is received.

25. An article comprising:
a computer readable medium; and
means for selecting a proxy station to respond to a multicast message sent from a first station in a shared medium network, wherein selecting the proxy station includes:
  maintaining availability information about other stations that are identified to the first station in transmissions over the shared medium;
  selecting, by the first station, one of the other stations to serve as a multicast proxy to respond to the multicast message sent from the first station using the availability information and predetermined selection criteria; and
  updating the availability information associated with the selected station if the selected station fails to respond to the multicast message within a predefined time limit, where the updating comprises updating the availability information associated with the selected station to indicate that the selected station should not be used as a multicast proxy until a subsequent transmission over the shared medium provides new physical layer feedback which indicates that the selected station can be used as a multicast proxy;
  wherein updating the availability information if the selected station fails to respond to the multicast message reduces a probability that the selected station that failed to respond to the multicast message will be selected to serve as the multicast proxy in a subsequent proxy selection procedure.

26. An article comprising:
a computer readable medium; and
means for establishing a station communicatively coupled with a plurality of other stations by a shared communications medium, the station including a proxy selection procedure configured to maintain availability information about the other stations that are communicatively coupled to the shared communications medium, use the availability information to select one of the other stations to serve as a multicast proxy to respond to a multicast message sent from the station, and update the availability information associated with the station selected to serve as the multicast proxy, if the station selected to serve as the multicast proxy fails to respond to the multicast message within a predefined period of time, where the updating comprises updating the availability information associated with the station selected to serve as the multicast proxy to indicate that the station should not be selected again unless a subsequent transmission indicates that the station can be used as a multicast proxy;
wherein updating the availability information if the selected station fails to respond to the multicast message reduces a probability that the selected station that failed to respond to the multicast message will be selected to serve as the multicast proxy in a subsequent proxy selection procedure.

* * * * *